United States Patent
Kanner et al.

(10) Patent No.: US 6,824,812 B2
(45) Date of Patent: Nov. 30, 2004

(54) PROCESS OF TREATING DATES

(75) Inventors: Joseph Kanner, Rehovot (IL); Shlomo Navarro, Holon (IL); Avinoam Daos, Mazksret Batya (IL)

(73) Assignee: The State of Israel - Ministry of Agriculture & Rural Development, Agricultural Research Organization, Beit-Dagan (IL)

( * ) Notice: Subject to any disclaimer, the term of this patent is extended or adjusted under 35 U.S.C. 154(b) by 322 days.

(21) Appl. No.: 10/061,315

(22) Filed: Feb. 4, 2002

(65) Prior Publication Data

US 2003/0148014 A1 Aug. 7, 2003

(51) Int. Cl.[7] .......................... A23B 7/02; A23L 3/015
(52) U.S. Cl. .................. 426/640; 426/455; 426/465
(58) Field of Search .................. 426/640, 639, 426/447, 455, 465, 468

(56) References Cited

U.S. PATENT DOCUMENTS

| | | | | |
|---|---|---|---|---|
| 3,952,112 A | * | 4/1976 | Fulger et al. | 426/321 |
| 4,578,275 A | * | 3/1986 | Spanier | 426/302 |
| 4,680,190 A | * | 7/1987 | Spiel et al. | 426/302 |
| 5,286,505 A | * | 2/1994 | Hartson et al. | 426/321 |
| 5,439,692 A | * | 8/1995 | Guzman et al. | 426/321 |
| 5,612,074 A | * | 3/1997 | Leach | 426/74 |
| 5,958,500 A | * | 9/1999 | Silver | 426/615 |
| 5,962,057 A | * | 10/1999 | Durance et al. | 426/465 |
| 6,068,874 A | * | 5/2000 | Grocholski | 426/465 |
| 6,268,012 B1 | * | 7/2001 | Sikora et al. | 426/640 |

FOREIGN PATENT DOCUMENTS

| | | | |
|---|---|---|---|
| EP | 0 331 281 | * | 9/1989 |
| EP | 0 404 543 | * | 12/1990 |
| EP | 0 435 302 | * | 7/1991 |

* cited by examiner

Primary Examiner—Keith Hendricks
(74) Attorney, Agent, or Firm—G. E. Ehrlich (1995) Ltd.

(57) ABSTRACT

A process of improving the appearance of a dried fruit, the process comprises subjecting the dried fruit to underpressure at a value and a time period sufficient for, and effective in, improving the appearance of a dried fruit.

38 Claims, 2 Drawing Sheets

Fig. 2a
Fig. 2b
Fig. 2c
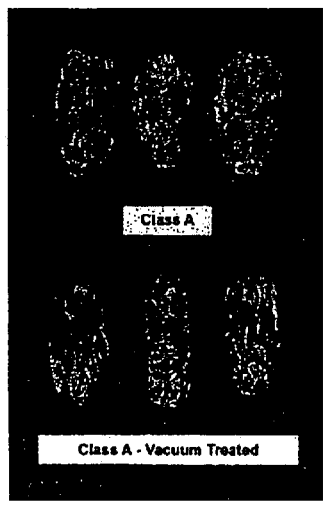
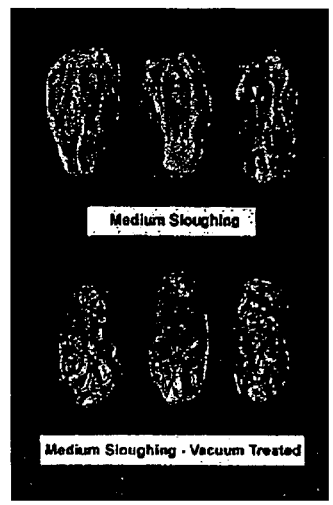
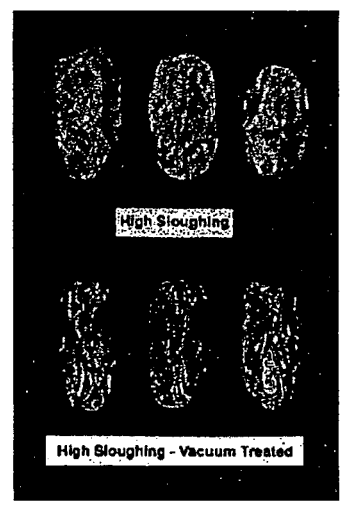

PROCESS OF TREATING DATES

FIELD AND BACKGROUND OF THE INVENTION

The present invention relates to a process of treating dried fruits, dates in particular, and, more particularly, to a process of improving the appearance and market value of sloughed dates and other dried fruits.

Dates are considered one of the most profitable fruits. High quality dates are sold by growers at 5–6 U.S. $ per kilogram.

Medjoul dates, for example, are considered the most profitable date variety in Israel.

Presently about 50% of Medjoul dates that are grown in the Jordan Valley and Bet-Shean Valley in Israel suffer from the sloughing phenomenon. The damage in Israel alone is estimated at 4 million dollars per year.

There is evidently a widely recognized need for, and it would be highly advantageous to have, a process of improving the appearance and market value of sloughed dates and other dried fruits.

SUMMARY OF THE INVENTION

The main object of the present invention is to provide a process for the elimination of sloughing in dates in generally and especially in Medjoul dates.

Without being bound by any theory in particular, it is believed that sloughing is due to a series of enzymatic reactions taking place in the fruit, which are highly influenced by the climacteric factors prevailing at the time of fruit maturation and ripening, which factors contribute to the enzymatic processes, which lead to sloughing. Such factors are evidently difficult to control and hence post-sloughing unsloughing process is in need and is provided by the present invention.

While reducing the present invention to practice it was uncovered that the process of the present invention, as is further described in detail hereinafter, also improves the coloration and brightness of dates and hence may be used to improve these qualities, as well as sloughing, in other dried fruits, such as, but not limited to, raisins, dried figs, dried papaya, dried prunes, dried mango, dried apricot, dried peach and dried apple.

According to one aspect of the present invention there is provided a process of improving the appearance of a dried fruit, the process comprising subjecting the dried fruit to underpressure at a value and a time period sufficient for, and effective in, improving the appearance of a dried fruit.

According to further features in preferred embodiments of the invention described below, the process further comprising wetting the dried fruit prior to said subjecting the dried fruit to said underpressure.

According to still further features in the described preferred embodiments wetting is effected by spraying the dried fruit with an aqueous solution.

According to still further features in the described preferred embodiments wetting is effected by dipping the dried fruit in an aqueous solution.

According to still further features in the described preferred embodiments wetting is effected by subjecting the dried fruit to an aqueous solution.

According to still further features in the described preferred embodiments the aqueous solution contains at least one sugar.

According to still further features in the described preferred embodiments the process further comprising drying the dried fruit following said wetting the dried fruit and prior to said subjecting the dried fruit to said underpressure.

According to still further features in the described preferred embodiments drying the dried fruit is at ambient temperature.

According to still further features in the described preferred embodiments the process further comprising drying the dried fruit following said subjecting the dried fruit to said underpressure.

According to still further features in the described preferred embodiments drying the dried fruit following said subjecting the dried fruit to said underpressure is under air flow at a temperature of 30° C.–80° C.

According to still further features in the described preferred embodiments said air flow is at 0.5–400 meters per minute.

According to still further features in the described preferred embodiments said value of said underpressure is 1–750 mm Hg.

According to still further features in the described preferred embodiments said time period is between 0.5–60 minutes.

According to still further features in the described preferred embodiments said underpressure is applied to said dried fruit while rotating or rocking the dried fruit.

According to still further features in the described preferred embodiments said dried fruit is a date.

According to still further features in the described preferred embodiments said dried fruit is selected from the group consisting of raisins, dried figs, dried papaya, dried prunes, dried mango, dried apricot, dried peach and dried apple.

According to still further features in the described preferred embodiments improving the appearance of the dried fruit comprises deepening coloration.

According to still further features in the described preferred embodiments wetting is effected by dipping the date in an aqueous solution.

According to still further features in the described preferred embodiments improving the appearance of the dried fruit comprises reducing or eliminating sloughing.

According to still further features in the described preferred embodiments improving the appearance of the dried fruit comprises removing sugar spots.

According to still further features in the described preferred embodiments improving the appearance of the dried fruit comprises reducing or eliminating sloughing, deepening coloration and increasing brightness.

According to another aspect of the present invention there is provided a process of unsloughing a date, the process comprising subjecting the date to underpressure at a value and a time period sufficient for, and effective in, unsloughing the date.

According to further features in preferred embodiments of the invention described below, the process further comprising wetting the date prior to said subjecting the date to said underpressure.

According to still further features in the described preferred embodiments wetting is effected by spraying the date with an aqueous solution.

According to still further features in the described preferred embodiments wetting is effected by deeping the date in an aqueous solution.

According to still further features in the described preferred embodiments wetting is effected by subjecting the date to an aqueous solution.

According to still further features in the described preferred embodiments said aqueous solution contains at least one sugar.

According to still further features in the described preferred embodiments the process further comprising drying the date following said wetting the date and prior to said subjecting the date to said underpressure.

According to still further features in the described preferred embodiments drying the date is at ambient temperature.

According to still further features in the described preferred embodiments the process further comprising drying the date following said subjecting the date to said underpressure.

According to still further features in the described preferred embodiments drying the date following said subjecting the date to said underpressure is under air flow at a temperature of 30° C.–80° C.

According to still further features in the described preferred embodiments said air flow is at 0.5–400 meters per minute.

According to still farther features in the described preferred embodiments said value of said underpressure is 1–750 mm Hg.

According to still further features in the described preferred embodiments said time period is between 0.5–60 minutes.

According to still further features in the described preferred embodiments said underpressure is applied to said date while rotating or rocking the date.

The present invention successfully addresses the shortcomings of the presently known configurations by providing a process of improving the appearance and market value of sloughed dates and other dried fruits.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 2a–c are color photographs of dates treated by the process of the present invention, illustrating vast and unexpected improvement in sloughing, coloration and brightness of the treated dates.

DESCRIPTION OF THE PREFERRED EMBODIMENTS

Figure 1:
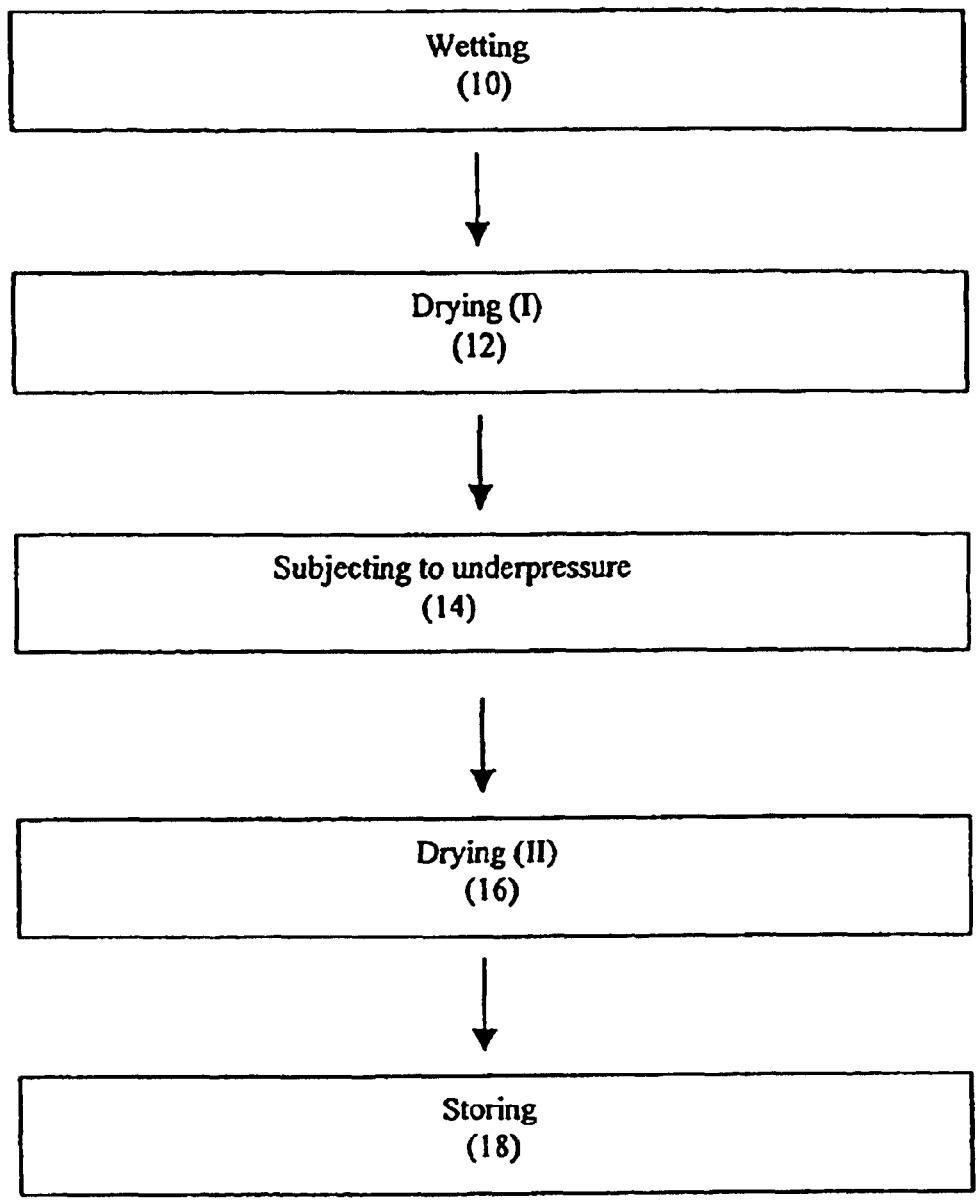
FIG. 1 is a flow chart illustrating a preferred embodiment of a process according to the present invention.

The present invention is of a process of treating dried fruits which can be used to improve the appearance and market value of dried fruits. Specifically, the present invention can be used to unslough sloughed fruits, to improve color intensity and deepness of dried fruits, to increase the brightness of dried fruits and/or to remove sugar spots for dried fruits such as, but not limited to, dates, raisins, dried papaya, dried prunes, dried mango, dried figs, dried apricots, dried peach and dried apple.

The principles and operation of a process according to the present invention may be better understood with reference to the drawings and accompanying descriptions.

Before explaining at least one embodiment of the invention in detail, it is to be understood that the invention is not limited in its application to the details of construction and the arrangement of the process components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Before explaining at least one embodiment of the invention in detail the process of date fruit maturation will be described.

A date passes through several stages on its way to maturity.

In the first stage, which is also known as the Kimri stage, the fruit is green and small.

In the second stage the fruit accumulates solids and reaches its maximal size, whereby the green color changes to yellow-red (depending on the variety). This stage is also called the Halal unripe stage. At this stage the fruit is hard and astringent. At this stage in Medjoul dates the enzymatic activity controlling fruit maturation is still at a low concentration.

In the third stage, also called the Ratab or moist mature stage, the changes take place from the base of the fruit, upwards. There is a reduction in water content and tannins and rise in reducing sugars and enzymatic reactions resulting in fruit softening and change in color from light yellow to dark brown (Kanner, 1967; Elmaleach, 1975; Bernart, 1989).

Daglat-Noor dates dry quickly on the tree due to low invertase activity characterizing this variety. The fruit does not go through the enzymatic softening stage and therefore remains hard textured. As opposed to this variety, the Hiani date which matures slowly in most areas in Israel does not ripen nor dry and is therefore called unripe. Hiani dates are then ripened by freezing and thawing. Until the 1960's it was accepted that invertase was directly responsible for date softening. In a previous work (Kanner, 1967) it was shown that it is possible to delay invertase enzyme activity and to activate only the pectolytic and cellulolytic enzymes of the fruit, thus softening the fruit. In that work it was shown for the first time, the importance of enzymes other than invertase in softening of dates. Other researchers later confirmed these findings (Coggins and Knapp; 1967, Coggins et al., 1968; Coggins and Knapp, 1969) by showing that at the beginning fruit development, cellulose is very high and reaches 85% of the dry matter. As sugar content rises cellulose is reduced to 2–6% of the dry matter (Elmaleach, 1975; Kanner et al., 1998). During ripening, at the Ratab stage, cellulose is hydrolyzed into sugars by cellulases.

The cellulase activity increases with fruit maturity and causes degradation of 80% of the cellulose, which results in fruit softening (Kanner et al., 1998). The pectin and protopectin compose 0.8–1.3% of the dry weight in dates (Kanner et al., 1998, Coggins, 1968). These substances, in addition to cellulose, play a major role in determining date texture. Pectin esterase and polygalactoronase are active at time of date maturation, causing de-esterification and hydrolysis of pectin, thus further contributing to fruit softening (Kanner et al., 1998).

Fruit softening can also be followed histologically. Researchers have shown that in the advanced maturing fruit the enzymes cause the cell walls to disappear, thus softening the fruit (Gofen, 1966; Nixon, 1961; Coggins and Knapp, 1968).

Recently it was shown that at time of fruit ripening, cellulase and polygalacturonase rise 5 to 10 times as compared to the unriped fruit. At the histological level there was a correlation between the rise of the aforementioned enzymes and decrease in polymers comprising the cell wall. There was a marked reduction in cellulose content.

In addition the effect of temperature on rate of fruit softening was tested. The rate of softening increased with temperature rise. It was found that below 35° C. fruit softening is very slow and raises very significantly at 40° C., and increasing up to 60° C.—a temperature which generally inhibits enzyme activity. Temperatures of 60° C. were recorded, however, in dates exposed to direct sunlight. At such a temperature the fruit softens quickly, but darkens considerably and sloughs significantly. Above 60° C. the enzymes and fruit softening are inhibited.

The sloughing phenomenon has been studied by a number of workers (Gofen, 1966; Elmaleach, 1973; Nixon 1961). Gofen conducted histological studies on sloughed dates and found that there was a separation between the skin and the endocarp of the fruit and collapse of the cell walls in this area. The author found that using a detergent before drying of the fruit lessened sloughing. Elmaleach et al., 1975, showed for the first time a connection between quality of fruit maturity in the Deri variety and sloughing. The researchers did not come to any conclusions as to the factors causing sloughing.

Referring now to the drawings, FIG. 1 illustrates a process of improving the appearance of a dried fruit according to the present invention.

The single most important step in the process of the present invention comprises subjecting the dried fruit to underpressure, as indicated at 14, at a value and a time period sufficient for, and effective in, improving the appearance of a dried fruit.

The time period and underpressure employed can vary according to the type dried fruit treated, the initial appearance of the dried fruit and the desired result.

For example, pressures ranging between 20–700 mm Hg, preferably, 50–650 mm Hg, more preferably, 150–650 mm Hg, still more preferably, 500–600 mm Hg, and time periods ranging between 0.5–60 minutes, preferably 2–20 minutes, can be used in different combinations. It will be appreciated in this respect that when lower pressure is used, treatment time can be shortened and vise versa to achieve similar results.

Preferably, underpressure is applied to the dried fruit while rocking or rotating the dried fruit. This ensures that air trapped between the peel and the flash of the fruit is squeezed out in due process.

In a preferred embodiment of the process of the present invention, the dried fruit is wetted (hydrated), as indicated at 10, and then at least partially, at least externally, dried, as indicated at 12, prior to its subjection to underpressure. Wetting or hydration according to the present invention can be effected by spraying the dried fruit with an aqueous solution and/or by dipping and optionally immersing the dried fruit in an aqueous solution. The aqueous solution can be tap water or the aqueous solution can contain at least one dissolved sugar, such as glucose syrup. Drying following wetting according to the present invention can be effected preferably at ambient temperature or alternatively in a drier, for 5 minutes and up to 24 hours, for example, depending on ambient or drier temperature. One of skills in the art would know how to tailor and best adapt this and other steps of the method to actual needs.

According to the present invention, wetting followed by drying of the dried fruit serve several functions.

First, by wetting the dried fruit as descried, it is washed from dirt that may have stuck to its exterior.

Second, wetting the dried fruit as descried, results in reactivation of enzymatic processes under the peel, such as hydrolysis of polysugar chains, e.g., cellulose and pectin, yielding smaller sugar chains, oligomers and monosugars having adhesive properties. This in turn results in better adhesion of the peel to the pulp following the treatment at underpressure, which reduces sloughing and intensifies fruit coloration.

Third, wetting the dried fruit as descried results in diffusion of sugars from the fruit and deposition thereof over the peel upon drying. This in turn results in increased brightness of the fruit following treatment at underpressure. This feature can be augmented by using an aqueous solution that contains at least one dissolved sugar therein as described above.

In a preferred embodiment of the invention, the underpressure treated dried fruit is further dried, as indicated at 16. Further drying is designed to bring the water content in the fruit to 20–24%, preferably to about 22%, which is the equivalent of water activity of about 0.64. This step in the process can be effected at ambient temperature, yet it is preferably effected at 30° C.–80° C., preferably at about 40° C., preferably under directional air flow of 0.5–400 meters per minute, preferably about 2 meters per second (=120 meters per minute).

This further drying step ensures that the enzymatic reactions that were activated during the wetting step will cease and further to prevent rutting of the fruit upon storage.

In a final step of the process, the treated fruit is optionally packaged and stored, depending on the selected fruit and designated storage time period, at room temperature, refrigerated (e.g., at 4° C.) or frozen (e.g., at 20° C.).

The above process was developed in particular to solve the problem of sloughing of dates. Nevertheless, while practicing the process of the invention it was uncovered that other features of the date, common to other dried fruits, are also improved, rendering the method applicable for improving the quality and market value of all dried fruits, such as, but not limited to—in addition to dates—raisins, dried papaya, dried prunes, dried mango, dried figs, dried apricot, dried peach and dried apple. These qualities include, in addition to reducing or eliminating sloughing where applicable, deepening or intensifying of coloration and increasing brightness.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLE

Reference is now made to the following example, which together with the above descriptions, illustrate the invention in a non limiting fashion.

Processing of Sloughed Dates by Vacuum Treatment

Fruits were washed in tap water and incubated at ambient air from 1 to 24 hours. This treatment moist the peel and the subcuticular fruit area. After this treatment the fruits were passed to a rotating vacuum cabinet which was rotated at 10 revolutions/min. Vacuum (600 mm Hg) was applied to the dates for 2–15 minutes, depending on the sample to be unsloughed.

Following this treatment the fruits were dried in an air drier (2 m/sec) at 30–80° C., preferably about 40° C., for 2–30 minutes to attain water content in the fruit of 20–24%, preferably about 22%, which is the equivalent of water activity of about 0.64.

For storage, the fruits were packaged in polyethylene bags and stored at 4° C. for short time periods or at −18° C. for longer time periods, e.g., 4–12 months or more.

FIGS. 2a–c illustrate representative results.

Class A (no sloughing) dates having a present market value of about 6 U.S. $, medium sloughed dates having a present market value of about U.S. $ 3, and highly sloughed dates having a present market value of about U.S. $ 1.5, were vacuum treated as described above.

It is clearly noted that the sloughing completely disappeared in all cases, substantially improving the appearance of the treated dates. It is further noted that fruit coloration and brightness are both improved following the treatment, even in class A (no sloughing) dates.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

REFERENCES CITED

Bernart, S. (1989) Frozen dates. M. Sc. Thesis, University of Jerusalem, Faculty of Agriculture, Rehovot.

Coggins, C. W. Jr., Knapp, J. C. F. (1967). Progress report: chemical and histological studies of tough and tender Deglet Noor dates. Date Grower's Institute Rep. 44: 15–16.

Coggins, C. W. Jr., Knapp, J. C. F. and Ricker, A. L. (1968). Post harvest softening studies of Deglet Noor dates: physical, chemical and histological changes. Date Grower's Inst. Rep. 45: 3–6.

Coggins, C. W. Jr., Knapp, J. C. F. (1969). Growth development, and softening of the Deglet Noor date fruit. Date Grower's Inst. Rep. 46: 11–14.

Elmaleach, H. (1975) The effects of technological factors on the quality of dates. M. Sc. Thesis, University of Jerusalem, Faculty of Agriculture, Rehovot.

Gofen, M. (1966) Sloughing of Dates. M. Sc. Thesis, University of Jerusalem, Faculty of Agriculture, Rehovot.

Kanner, J. (1967). Biochemical changes in rehydrated dry dates. M.Sc. Thesis, University of Jerusalem, Faculty of Agriculture, Rehovot.

Kanner, J., Navarro, S., Donahaye, E. J., Ben-Shalom, N., Shoval, N., Granit, R., Rindner, M., Azrieli, A., Pinto, R. (1998). Development of technological process for improving Madjoul dates quality. Report to Ministry of Agriculture.

Nixon, R. W. (1961). Dates. Dates Grower's Inst. Rep. 14: 10–13.

What is claimed is:

1. A process of deepening a coloration, increasing a brightness, removing sugar spots and/or reducing or eliminating sloughing of a dried fruit, the process comprising sequentially:

wetting the dried fruit;

drying the dried fruit; and subjecting the dried fruit to underpressure at a value and a time period sufficient for, and effective in, deepening the coloration, increasing the brightness, removing sugar snots and/or reducing or eliminating sloughing of the dried fruit.

2. The process of claim 1, wherein said wetting is effected by spraying the dried fruit with an aqueous solution.

3. The process of claim 1, wherein said wetting is effected by dipping the dried fruit in an aqueous solution.

4. The process of claim 1, wherein said wetting is effected by subjecting the dried fruit to an aqueous solution.

5. The process of claim 4, wherein said aqueous solution contains at least one sugar.

6. The process of claim 1, wherein said drying the dried fruit is at ambient temperature.

7. The process of claim 1, further comprising drying the dried fruit following said subjecting the dried fruit to said underpressure.

8. The process of claim 7, wherein said drying the dried fruit following said subjecting the dried fruit to said underpressure is under air flow at a temperature of 30° C. −80° C.

9. The process of claim 8, wherein said air flow is at 0.5–400 meters per minute.

10. The process of claim 1, wherein said value of said underpressure is 1–750 mm Hg.

11. The process of claim 1, wherein said time period is between 0.5–60 minutes.

12. The process of claim 1, wherein said underpressure is applied to said dried fruit while rotating or rocking the dried fruit.

13. The process of claim 1, wherein said dried fruit is a date.

14. The process of claim 1, wherein said dried fruit is selected from the group consisting of raisins, dried figs, dried papaya, dried prune, dried mango, dried apricot, dried peach and dried apple.

15. A process of deepening a coloration, increasing a brightness, removing sugar spots and/or reducing or eliminating sloughing of a date, the process comprising sequentially:

wetting the date;

drying the date; and subjecting the date to underpressure at a value and a time period sufficient for, and effective in, deepening the coloration, increasing the brightness, removing sugar spots and/or reducing or eliminating sloughing of the date.

16. The process of claim 15, wherein said wetting is effected by spraying the date with an aqueous solution.

17. The process of claim 15, wherein said wetting is effected by dipping the date in an aqueous solution.

18. The process of claim 15, wherein said wetting is effected by subjecting the date to an aqueous solution.

19. The process of claim 18, wherein said aqueous solution contains at least one sugar.

20. The process of claim 15, wherein said drying the date is at ambient temperature.

21. The process of claim 15, further comprising drying the date following said subjecting the date to said underpressure.

22. The process of claim 21, wherein said drying the date following said subjecting the date to said underpressure is under air flow at a temperature of 30° C. –80° C.

23. The process of claim 22, wherein said air flow is at 0.5–400 meters per minute.

24. The process of claim 15, wherein said value of said underpressure is 1–750 mm Hg.

25. The process of claim 22, wherein said time period is between 0.5–60 minutes.

26. The process of claim 15, wherein said underpressure is applied to said date while rotating or rocking the date.

27. A process of unsloughing a date, the process comprising sequentially:

wetting the date;

drying the date; and subjecting the date to underpressure at a value and a time period sufficient for, and effective in, unsloughing the date.

28. The process of claim 27, wherein said wetting is effected by spraying the date with an aqueous solution.

29. The process of claim 27, wherein said wetting is effected by dipping the date in an aqueous solution.

30. The process of claim 27, wherein said wetting is effected by subjecting the date to an aqueous solution.

31. The process of claim 30, wherein said aqueous solution contains at least one sugar.

32. The process of claim 27, wherein said drying the date is at ambient temperature.

33. The process of claim 27, further comprising drying the date following said subjecting the date to said underpressure.

34. The process of claim 33, wherein said drying the date following said subjecting the date to said underpressure is under air flow at a temperature of 30° C. –80° C.

35. The process of claim 34, wherein said air flow is at 0.5–400 meters per minute.

36. The process of claim 29, wherein said value of said underpressure is 1–750 mm Hg.

37. The process of claim 27, wherein said time period is between 0.5–60 minutes.

38. The process of claim 29, wherein said underpressure is applied to said date while rotating or rocking the date.

* * * * *